Feb. 10, 1970 — R. P. MOMMER — 3,494,333

ANIMAL INSECTICIDE DUST DISPENSER BAG

Filed Aug. 7, 1968

INVENTOR:
Richard P. Mommer,
BY
ATTORNEY.

United States Patent Office 3,494,333
Patented Feb. 10, 1970

3,494,333
ANIMAL INSECTICIDE DUST DISPENSER BAG
Richard Paul Mommer, Loveland, Colo., assignor to Balcom Chemicals, Inc., Greeley, Colo., a corporation of Colorado
Filed Aug. 7, 1968, Ser. No. 750,818
Int. Cl. A01k 29/00
U.S. Cl. 119—159
8 Claims

ABSTRACT OF THE DISCLOSURE

An insecticide dust dispenser bag made of an inner porous bag enclosed by an outer flexible water-proof bag having an opening in its bottom portion whereby when the bag is suspended for use insecticide material may be dispensed through the porous bag upon actuation by an animal.

---

This invention relates to animal husbandry, and more particularly to a suspended dust container applicator bag for livestock, for livestock self application use.

The use of semi-porous cloth bags, such as burlap, is known for dispensing dust on animals rubbing thereunder. Such bags are sometimes held by a rigid straight bar or tight rope or wire extending between two uprights, and which extension bar or means usually becomes bent and sags during use. More usually the bags are suspended in use from a loose or sagging rope between two uprights. In either event, heretofore as far as known, the lower extremity of the bag hangs as a circular bag surface due to the sagging of the holding means, among others, and as a result, an excessive deposit of dust is inefficiently released from the bag on the animal rubbing thereagainst, with much of that dust, as a result, lost into the atmosphere and wind and not deposited onto the animal. Another problem with these bags heretofore has been their susceptibility to adverse weather conditions during periods of high humidity and when it rains, resulting in the insecticide dust caking hard, and thus hindering practical use thereafter.

The purpose of my invention is to overcome those disadvantages. I have found that said animal self application of dust from a bag can be by my novel bag combination wherein the lower edge of the bag, with which the animal comes into contact, hangs in a horizontal straight line and in longitudinal alignment with the bag holding means cross-wise of the animal.

It is a principal object of my invention to provide a novel porous insecticide dust dispensing bag, in combination with a sagging rope holding means therefor, and wherein the bag is designed to be held by that sagging rope but yet the lower edge of the bag nevertheless is always held thereby in a straight horizontal line in a vertical plane parallel with that rope holding means, so as to avoid unnecessary loss of dust in the self application thereof by the animal thereagainst, by distributing the dust at that straight line lower edge more uniformly.

It is another principal object of my invention to provide such a novel dust elongated bag held by a sagging rope, but with its lower edge held thereby in a straight horizontal plane by the provision of suitable grommets inserted at an edge of the bag opposite the lower edge and through which the rope is threaded, and which grommets are positioned in an extended curved arc so that the sagging rope extending therethrough nevertheless holds the lower edge of the bag in said straight line.

Another principal object of my invention is the provision of such a porous insecticide dust dispenser bag and having the exterior of that bag enclosed within a suitable water-proof material to prevent loss and caking of the insecticide dust on certain weather conditions.

A further object of this invention is the provision of such porous insecticide suspended dust dispenser bag substantially encased by a water-proof material and with a slot sifter opening provided at the lower edge of the said water-proof material when the bag is suspended and which opening is normally held closed when the bag is not in use by a suitable manually operable zipper closure means.

Another object is the provision of a simple and inexpensive water-proof insecticide dust dispenser bag adapted to be suspended by a holding means and with the lower edge of the bag having an opening through which the dust held by the bag may escape from the bag.

Another object is the provision of a plurality of spaced grommet openings along one longitudinal edge of the dust bag, and which grommets are designed to have a rigid rod or a rope holding means threadingly extended through certain ones thereof to thereby hold and suspend the bag, and with certain others of said grommets arranged in an arc and designed to have a sagging rope holding means threadingly extended therethrough, so that at all times of said suspended holding by either of said holding means through certain of those grommets, that the lower edge of the bag will be held at all times in a horizontal or straight line and parallel with the vertical plane of said holding means.

Other and further objects will be apparent to those skilled in the art from the following explanation and the drawings of a preferred embodiment of my invention, and in which drawing.

Figure 3:
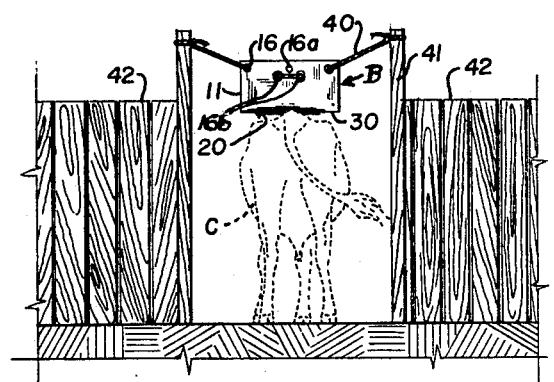
FIGURE 3 is a reduced diagrammatical view showing my novel suspended dispenser bag in the self application use thereof by a cow, and as viewed from the rear of the cow.

In this embodiment I use a conventional loosely woven burlap bag 10, completely enclosed by being sewed at each end thereof as at seams 12. I fill the bag with suitable insecticide dust, I, by piercingly inserting a sharp funnel into a longitudinal edge, at point indicated as 17, through which funnel the dust is inserted into and the interior of the bag filled. I have not illustrated that filling, but it is by conventional means. Then I completely encase that filled burlap bag by a suitable flexible sheet of water-proof polyethylene material 11, as by folding a flat sheet thereof completely over the burlap bag and then by conventionally heat-sealing the outer three overlapped edges 13, 14 and 15 thereof together. I then punch press clampingly insert and affix suitable conventional round metal ring grommets through all layers of the said outer and inner bags. Those grommets are of conventional design and it will be understood that they clampingly hold the material together where they are inserted through the four layers thereof of the two bags. The grommets are large enough, or about 1 inch inside diameter, to accommodate a suitable rod or rope holding means to be threaded therethrough, for purposes of suspendingly holding the bag B, as illustrated in FIGURE 3. In FIGURE 3, I illustrate how I suspend one of my novel bags between two posts 41 and 42 by a sagging or comparatively loose rope 40 with the ends of the rope secured to the adjacent posts, and so that the cow may walk under the bag B and yet the lower edge 30 thereof will then rub against the cow's upper back and backbone.

Figure 1:
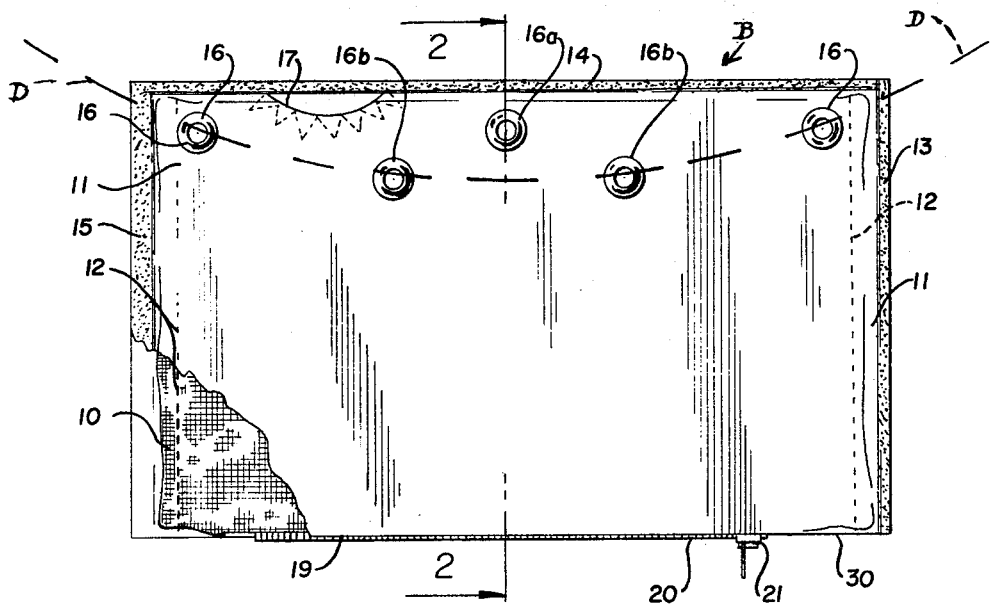
FIGURE 1 is an elevational side view of my novel complete dust insecticide self applicator dispensing bag, with the left lower corner of the outer water-proof corner thereof 11 broken away for better understanding.
Figure 2:
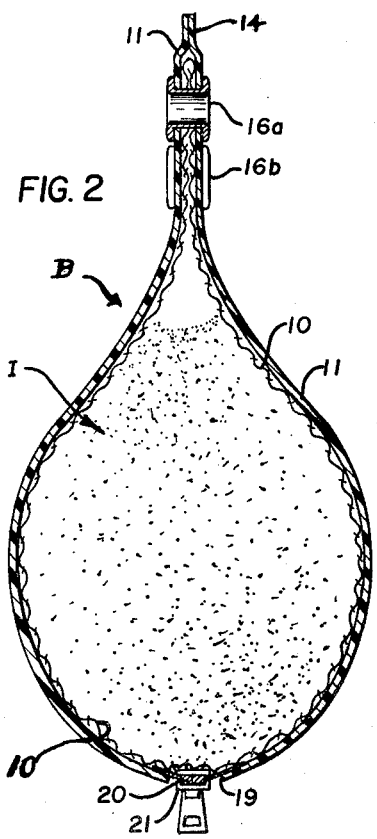
FIGURE 2 is a cross-sectional view thereof taken on the line 2—2 of FIGURE 1 and looking in the direction of the arrows.

I preferably align at least 3 or 4 of those grommets in a downwardly extending arc curve, as shown in FIGURE 1, by the dotted line D, so that when a rope is extended through those four grommets, as shown on that arc curve line 16–16b–16b–16 and with the ends of the rope saggingly secured to the posts as illustrated in FIGURE 3, that though the rope be saggingly secured, nevertheless the bag in its entirety will be held by that rope in cooperation with those grommets 16–16b–16b–16, with the lower edge of the bag opposite the rope, indicated as 30, held thereby in a horizontal straight line, and in a vertical plane parallel with that rope. As explained, by that lower edge 30 being so held in such a straight line, dust leaving the lower opening of the bag, as will be explained, is closer to the animal than would occur were that lower edge in the vertical plane of the rope holding means in a normal rounded or sagging condition, and thereby waste of the dust is prevented.

While I have shown an extra grommet 16a, in straight alignment with the two illustrated outer upper edge grommets adjacent the ends of the bag, I simply provide that extra grommet 16a, in the event that a rigid rod is desired to be used and threaded through those three upper straight line grommets.

It is important in my invention that I place the 4 illustrated grommets 16, 16b, 16b, and 16, in a curved arc line, indicated by the dotted line C, as explained, so as to be able to have a sagging holding means rope therethrough, so that the lower edge of the bag is thereby held in a horizontal straight line and parallel with the vertical plane of that rope. Otherwise, heretofore as far as known, were a sagging rope extended through straight line aligned grommets, the lower edge of the insecticide bag held thereby would be in a rounded lower edge bag arc in a plane vertical to the rope and much waste of the dust upon contact with the back of the cow result because of the great space between that lower rounded bag edge and the cow's back. With my invention, on suspension use having such straight line lower edge of the bag, that distance between that straight lower edges of the bag and the cow's back is greatly reduced, and with the proximity between the two small enough that little dust is lost when the cow rubs thereagainst. I only provide the extra upper straight line grommet 16a, for use when the user decides to use a rigid bar holding means instead of a sagging rope one.

The outer water-proof polyethylene bag 11 prevents any dust from sifting therethrough, and the dust as sifts through the inner burlap bag 10 therein is normally prevented from leaving my composite bag structure B. To provide a method for the use escape of the insecticide dust upon agitation by the animal rubbing against the bag, I provide a sifter dust escape slot opening 19, in the outer polyethylene bag at the longitudinal diagrammatic opposite side thereof to the upper edge grommets. Thus, when the bag is supported by a rope through those grommets, that sifter slot opening, 19, will be at the lower horizontal edge of the elongated bag, B. During manufacture and filling of the bag, and the merchandising, handling and shipping thereof before suspended use thereof as illustrated, it is necessary that said slot opening 19 be held closed, and so I provide a suitable operable conventional manually operable holding means for normally holding that slot closed, such as by a conventional zipper 20, co-operatively secured to the sides of that slot with a conventional slide closing fastening member 21 co-operating with the slot edges.

Another method of assembling and providing my novel composite two-ply duster bag, wherein the inner bag is a coarse mesh cloth bag, and the outer bag is of waterproof or polyethylene bag having a suitable central lower sifter opening therein with a manually operable means of opening and closing that opening, and with the composite bag having a plurality of downwardly extending cresent-curve aligned grommet openings on the edge thereof opposite that sifter lower opening and for receiving a loose rope therethrough for purpose explained, and which I sometimes use, is to use a pre-formed polyethylene elongated tubular-like outer bag having one end only open, rather than to form one out of a sheet, and into which I insert the pre-filled inner burlap bag and then to seal the open end of the polyethylene bag, and with that pre-formed polyethylene bag having a pre-formed conventional manually operable rolled and slotted or crimped edges at the slot formed in a longitudial side thereof. Then I place the grommets in place as shown and mentioned and in the same arc curve. That type of a preformed crimped edge slot has a conventional manually operable slot holding means having one edge thereof cross-sectionally formed as a male edge and the other edge thereof on the opposing side cross-sectionally formed as a conventional female edge, adapted for manual closing operation.

While I have just explained this other method of making my novel suitable two-ply dispenser bags, with my novel curve aligned grommets, it is to be understood that any suitable method of making my novel composite bag may be used, wherein there is a coarse mesh inner bag and a water-proof flexible outer bag, with a suitable central lower manually closable sifter opening therein, and with said curve or arc aligned grommet openings, or equivalent suitable holding means, secured to the longitudinal edge of the bag opposite the sifter slot and at its upper edge, designed to receive a sagging rope in co-operation therewith for the purpose of holding the elongated bag so that its lower edge is held thereby in a horizontal straight line and in a perpendicular plane parallel with the sagging holding means, for reasons explained.

In the operation of my novel livestock self application insecticide dust dispenser bag, as illustrated in FIGURE 3, though the sagging rope 40 is threaded through the downward curve arc aligned grommets 16 and between the posts 41 and 42, the lower edge 30 of my novel bag B, will nevertheless be held in a straight horizontal line and parallel with the vertical plane of the holding rope 40. The bag is held at a height to permit the animal to walk thereunder and with the animal's back just contacting and rubbing the lower edge of the bag adjacent the sifter opening 19. When the bag is so placed for self applicator use by the animal, it will be understood that the sifter closing means 20, 21, is first manually operated to open that slot 19, so that as the cow rubs the underside of the bag near that slot 19, the dust in 10 sifts through that porous inner bag 10 and falls against the inner wall of the outer bag 11 and downwardly therein and will be released and deposited, by the motion or agitation of the cow, through the opening 19 of the outer bag and that dust will then be deposited onto the cow's back and body rubbing thereagainst, and which is called self animal application.

I have found, and it is to be understood to be within the teachings of my invention, that the interior coarse mesh burlap bag can be eliminated in its entirety, by only having an equivalent mesh-like coarse cloth so-called vent piece secured inside of the outer water-proof bag 11, adjacent to and across the sifter slot opening 19, so that when the slot 19 is opened that the dust within the polyethylene bag will be sifted therethrough upon an animal rubbing against the bag adjacent that point.

Many changes and modifications may be made in my invention in the preferred embodiment hereof hereinbefore shown and described in detail within the scope and teaching thereof, such as just mentioned in the preceding paragraph hereto, though not illustrated, the entire burlap inside bag may be eliminated, and, as a mechanical equivalent, a similar coarse mesh cloth to the burlap could be secured inside of the outer polyethylene bag at it lower edge to completely cover and extend over the inside of the slot opening 19, and that polyethylene bag would then be the insecticide container and when the zipper slot closing thereof 20–21 is opened, an agitation of the bag by the animal at the edge adjacent the opening 19, would then cause the insecticide to sift through such mesh material and the insecticide would escape therethrough and the sifter opening in an equivalent to the preferred embodiment as shown as described.

What I claim and desire to secure by Letters Patent is:

1. An animal self applicator bag means for dispensing insecticide dust, comprising, in combination, an inner porous first bag adapted to contain said dust, an outer flexible water-proof second bag encasing the first bag, means for elevatingly suspending said bag in a position to be agitated by an animal, said second bag having a longitudinally extending dust escape opening formed in the longitudinal edge thereof opposite from the suspending means thereof, whereby animal agitation of the bag when the bag is so suspended will cause the dust to work through the inner bag and escape out of said escape slot onto the animal.

2. A bag as described in claim 1, and including the means for so holding and suspending the bag comprising a sagging rope holding means, and a plurality of spaced apart grommets aligned in an arc curve on a longitudinal edge of the bag opposite the longitudinally extending opening and with the center of the extended arc line of that curve being inwardly of the bag and said grommets being adapted to receive said rope means therethrough and being adapted for suspending the bag on and by the rope and with the lower edge of the bag opposite the grommets being held in a horizontal line in a vertical plane parallel with the rope holding means.

3. A bag as described in claim 1, and wherein said opening is adapted to be normally held closed by a manually operable zipper-like holding means.

4. A bag as described in claim 1, and including the suspension member holding means adapted to be extended between a pair of posts, a plurality of at least four grommets formed through the bag at a longitudinal edge opposite said opening edge and with three of the grommets being aligned in a straight line, and several of the grommets being formed substantially in an extended arc curve line, the grommets being adapted to have the holding means extendingly threaded through some thereof, with the ends of said grommet arc curve line being positioned uppermost when the bag is so held by the holding means, so that either a rigid extension holding member means may be so inserted through the straight line grommets, or so that a sagging non-rigid rope holding member means may be so inserted through the arc curve extended line grommets, and whereby, in either of said respective events of such a rigid or non-rigid extension member holding means use, the lower edge of the bag will be held in substantially a horizontal straight line and parallel with the vertical plane of the holding member used.

5. An animal self applicator insecticide dust bag means for dispensing insecticide dust on animals, comprising, in combination, a flexible water-proof elongated bag adapted to contain such dust, a longitudinally extending elongated opening formed in the bag a coarse mesh porous cloth-like means secured to the bag and over said opening, manually operable closing means associated with said opening edges for effecting a closing and opening thereof, and a plurality of grommet holding means secured to the bag edge in longitudinal alignment to said opening and on the side of the bag opposite therefrom and adapted for co-operation with a sagging holding means for holding the bag with said opening in a horizontal plane in vertical alignment with the grommet edge, whereby animal agitation against the bag will cause the insecticide to be deposited through said porous cloth-like inner covering of the opening and onto the animal through the opening when the opening is open.

6. An animal self-applicator insecticide dust dispensing bag comprising a flexible water-proof bag having an elongated upper end and an elongated lower end, said lower end being open so as to provide an elongated longitudinally extending discharge opening for said bag; a porous cloth-like means secured to said bag and extending across said elongated longitudinally extending discharge opening and forming therewith a porous discharge means for said insecticide dust; longitudinally extending openable closure means associated with the lower end of said water-proof bag to preclude discharge of insecticide dust through said longitudinally extending elongated discharge opening; said longitudinally extending closure means being operable to open position by longitudinal movement thereof in one direction.

7. An animal self-applicator insecticide dust dispensing bag comprising an elongated water-proof bag having an upper longitudinally extending end and a lower longitudinally extending open end; porous cloth means closing said open end and forming therewith a discharge means for said insecticide dust; and means including at least spaced grommet openings disposed longitudinally along said upper longitudinally extending end of said bag for suspending said insecticide bag from a flexible support that hangs freely between two spaced fixed points so that the lower longitudinally extending open end of said bag lies in a horizontal plane.

8. An animal self-applicator insecticide dust bag as defined in claim 7 wherein longitudinally extending openable closure means are associated with the lower end of said water-proof bag to preclude discharge of insecticide dust through said longitudinally extending discharge opening, said longitudinally extending closure means being operable to open position by longitudinal movement thereof in one direction.

References Cited

UNITED STATES PATENTS

| 1,091,900 | 3/1914 | Sutton | 119—33 |
| 2,814,273 | 11/1957 | Dickens | 119—159 |
| 3,364,900 | 1/1968 | Knapp | 119—159 |

HUGH R. CHAMBLEE, Primary Examiner

U.S. Cl. X.R.

150—3; 222—189

UNITED STATES PATENT OFFICE
CERTIFICATE OF CORRECTION

Patent No. 3,494,333                          February 10, 1970

Richard Paul Mommer

It is certified that error appears in the above identified patent and that said Letters Patent are hereby corrected as shown below:

Column 2, line 18, cancel "ones". Column 3, line 34, after "cow" insert -- would --. Column 4, line 6, "longitudial" should read -- longitudinal --; line 21, "closable" should read -- closeable --. Column 5, line 56, "bag" should read -- bag, --.

Signed and sealed this 24th day of November 1970.

(SEAL)
Attest:

Edward M. Fletcher, Jr.                      WILLIAM E. SCHUYLER, JR.
Attesting Officer                              Commissioner of Patents